United States Patent [19]

Sato et al.

[11] Patent Number: 4,608,321

[45] Date of Patent: Aug. 26, 1986

[54] CERAMIC AND METAL COMPOSITE BODY

[75] Inventors: Yasushi Sato; Hiroshi Matsui, both of Aichi, Japan

[73] Assignee: NGK Spark Plug Co., Ltd., Aichi, Japan

[21] Appl. No.: 702,736

[22] Filed: Feb. 19, 1985

[30] Foreign Application Priority Data

Feb. 20, 1984 [JP] Japan .................................. 59-31245
Feb. 20, 1984 [JP] Japan .................................. 59-31246

[51] Int. Cl.$^4$ ............................................. B22F 7/02
[52] U.S. Cl. .................................... 428/632; 428/621; 428/651; 123/193 R
[58] Field of Search ...................... 428/632, 651, 621; 123/193 R

[56] References Cited

U.S. PATENT DOCUMENTS 3,918,922  11/1975  Anderson ............................ 428/621

Primary Examiner—Veronica O'Keefe
Attorney, Agent, or Firm—Finnegan, Henderson, Farabow, Garrett & Dunner

[57] ABSTRACT

A zirconia-metal composite body comprises a zirconia ceramic part and a metallic part joined together, characterized in that irregularities are formed in the surface of the zirconia ceramic part coming into contact with the metallic part and the zirconia ceramic and metallic parts are joined together by brazing through the irregularities.

14 Claims, 4 Drawing Figures

CERAMIC AND METAL COMPOSITE BODY

BACKGROUND OF THE INVENTION

The present invention relates to zirconia-metal composite bodies, and more particularly, to composite bodies comprising zirconia ceramic and metallic parts joined together.

Use of ceramics as parts of internal combustion engines, such as a cylinder liner, a piston, a clyinder head, and a pre-chamber, or of compressors and machines tools, for example, for which high abrasion resistance is required, has been extensively investigated in recent years. Particularly in internal combustion engines, application of zirconia-metal composite bodies with a zirconia ceramic part having superior heat insulation properties has been attempted to increase thermal efficiency. This attempt, however, faces a problem that zirconia ceramic and metallic parts are difficult to join together and no satisfactory joining can be obtained.

Zirconia ceramic and metallic parts have been joined together by techniques such as shrinkage fit utilizing thermal expansion and a method of joining together by cast molding. When, however, zirconia-metal composite bodies produced by the above methods are used at elevated temperatures or in the condition that they are subject to great impulse, a gap is formed between the zirconia ceramic and metallic parts joined together and, in some cases, they are separated from each other.

SUMMARY OF THE INVENTION

The present invention is intended to overcome the above-described problem and an object of the present invention is to provide zirconia-metal composite bodies having a stabilized, satifactory joint or bonded structure.

It has been found that the object is attained by making irregularities in the surface of a zirconia ceramic part coming into contact with a metallic part, and brazing the zirconia ceramic and metallic parts, so that the parts are joined together firmly through the irregularities.

Accordingly the present invention relates to a zirconia-metal composite body comprising zirconia ceramic and metallic parts joined together, wherein irregularities are formed in the surface of the zirconia ceramic part coming into contact with the metallic part, and the zirconia ceramic and metallic parts are joined together by brazing through the irregularities.

DETAILED DESCRIPTION OF THE INVENTION

The present invention will hereinafter be explained in detail with reference to the accompanying drawings.

Figure 1:
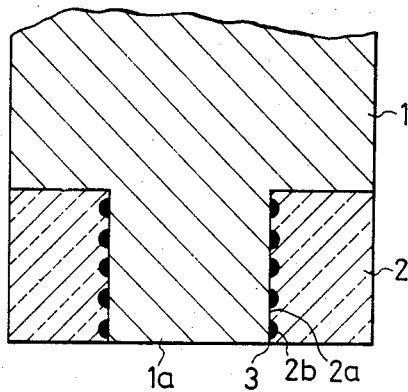
FIG. 1 is a cross-sectional view of a part of a zirconia-metal composite body of a first embodiment of the present invention.

Referring to FIG. 1 illustrating the first embodiment of the present invention, there is shown a cross-section of a part of the zirconia-metal composite body of the present invention. The zirconia-metal composite body comprises a metallic part 1 and a zirconia ceramic part 2. In producing the metallic part or member 1, a metal material having good heat resistance and corrosion resistance is selected depending on the purpose of the composite body. The zirconia ceramic part 2 which is a ceramic member comprised of zirconia, is made of a zirconia sintered body. Irregularities 2b are formed in an inner surface 2a of the zirconia ceramic part 2 which comes into engagement with a projected portion 1a of the metallic part 1. These irregularities may be in any desired form, for example, a plurality of ring-like grooves, and can be formed easily by techniques such as screw cutting or threading. The projected portion 1a of the metallic part 1 and the inner surface 2a of the zirconia ceramic part 2 are joined together by brazing with a brazing material 3. This brazing material 3 is a silver or copper brazing material and is used for the purpose of brazing by heating in an inert atmosphere.

In order to increase the joining properties of the metallic part 1, it is desirable that the projected portion 1a be electroplated with metals exhibiting good wettability to the brazing material 3, such as nickel and copper. It has also been confirmed that the thickness of the plated layer is necessary to be at least $10\mu$ (microns) from a viewpoint of securing a satisfactory joint. As the metal constituting the metallic part 1, only those metals having a coefficient of thermal expansion near that of zirconia are effective, since if the coefficient of thermal expansion of the metal is too large, a tensile stress is exerted on the ceramic, resulting in the break-down of the zirconia ceramic part 2.

Figure 2:
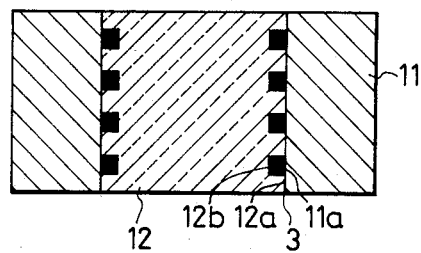
FIG. 2 is a cross-sectional view of a part of a zirconia-metal composite body of a second embodiment of the present invention.

FIG. 2 is a cross-sectional view of a part of a zirconia-metal composite body according to the second embodiment of the present invention. This zirconia-metal composite body comprises a tubular metallic part 11 and a cylindrical zirconia ceramic part 12 fitted through the tubular metallic part 11. Irregularities 12b are formed in an outer surface 12a of the zirconia ceramic part 12 coming into contact with an inner hole 11a of the metallic part 11, and the metallic part 11 and the zirconia ceramic part 12 are joined together through a brazing material 3 in the irregular areas. In this embodiment, the brazing material enters the clearance between the metallic part 11 and the zirconia ceramic part 12 having the irregularities 12b, and serves to join together firmly the zirconia ceramic part 12 and the metallic part 11. Moreover, since the brazing material itself has a buffering action, it serves to prevent the ceramic part 12 from cracking.

A zirconia-metal composite body of the structure as shown in FIG. 2 was produced, comprising a tubular part made of stainless steel and a cylindrical zirconia sintered body with a plurality of ring-like grooves formed in the outer periphery thereof, as joined together by brazing with a silver brazing material at 850° C. in a hydrogen furnace. This zirconia-metal composite body was subjected to a rapid heating/cooling test comprising heating at 300° C. for 20 minutes and soaking in water maintained at 20° C. Even if the test was conducted repeatedly more than 15 times, the separation or formation of gap did not occur; the joint between the metallic and zirconia ceramic parts was strong. Moreover, the zirconia ceramic part did not crack.

Figure 3:
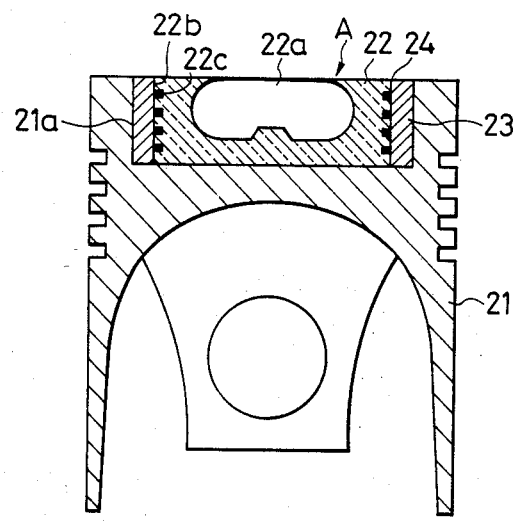
FIG. 3 is a cross-sectional view of an internal combustion engine of a third embodiment of the present invention.

FIG. 3 is a cross-sectional view of a piston of an internal combustion engine according to the third embodiment of the present invention. In this embodiment, a nearly cylindrical zirconia sintered body 22 with irregularities formed in the outer periphery thereof is joined to a piston main body 21 made of an aluminum alloy through a ring 23 made of a heat resistant metal having a coefficient of thermal expansion intermediate between those of the sintered body 22 and the main body 21. If necessary, the zirconia sintered body 22 is provided with a crown-shaped concave portion 22a at the combustion chamber side. The coefficient of thermal expansion of the heat resistant metal ring 23 is from $10 \times 10^{-6}$ to $24 \times 10^{-6}/°C$. Suitable examples of such heat resistant metals are stainless steel and cast iron. More specifically, SUS 304 ($18.4 \times 10^{-6}/°C$.) and Ni-Resist (high nickel cast iron) ($19 \times 10^{-6}/°C$.) are useful heat resistant metals. The sintered body 22 and the ring 23 were joined together with a brazing material 24 such as silver and copper. In this embodiment, irregularities 22c are previously formed in the outer periphery 22b of the zirconia sintered body 22. These irregularities 22c—22c may be in any desired form, for example, a plurality of concave or convex grooves formed in the axial direction, knurling grooves, or simple threads, and can be formed by cutting, for example, during the molding process. The outer periphery 22b of the zirconia sintered body 22 and the surface of the heat resistant metal ring 23 may be tapered toward the tops thereof.

The piston of this embodiment is produced as follows.

The zirconia sintered body 22 with the irregularities 22c formed in the outer periphery 22b thereof is first produced and then fitted through the heat resistant metal ring 23 with a silver brazing plate 24 provided on the outer periphery 22b of the sintered body 22. They are then brazed with silver by heating in a furnace in an inert atmosphere. The thus-produced assembly A is disposed as shown in FIG. 3 and then die casted with an aluminum alloy, or a hole 21a having an inner diameter slightly smaller than the outer diameter of the heat resistant metal ring 23 is bored in the piston main body 21 which has been die casted and then the above assembly A is fitted in the hole 21a by shrinkage fit. Moreover, although not shown, the metal ring 23 may be provided with a male screw in the outer periphery thereof and the concave portion of the piston main body, with a female screw, which are joined together by screwing. In brief, the two parts may be joined together by any suitable method. In the case of cast molding, suitable convex portions may be formed in the outer periphery of the metal ring 23 to maintain its joining force with the aluminum alloy.

Figure 4:
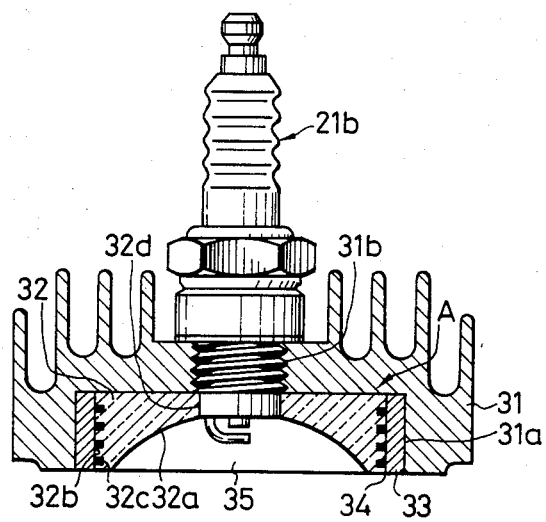
FIG. 4 is a cross-sectional view of a cylinder head of a fourth embodiment of the present invention.

FIG. 4 is a cross-sectional view of a cylinder head according to the fourth embodiment of the present invention. This cylinder head 31 is for a single cylinder of a two-cycle engine and made of an aluminum alloy, and includes a zirconia sintered body 32, heat resistant metal ring 33 fitted to the outer periphery 32b of the sintered body 32, and a brazing material 34. A concave portion 31a is bored in the cylinder head 31 at the combustion chamber side 35. Irregularities 32c are formed in the outer periphery 32b of the zirconia sintered body 32 as produced in the same manner as in the above embodiment, and the heat resistant metal ring 33 is joined to the outer periphery by the use of a silver brazing material 34. The thus-produced assembly A is fitted by shrinkage fit, for example. A plug-fitting hole 32d exposed to the combustion chamber side wall 32a of the zirconia sintered body 32 is provided and a spark plug 21b is screw fitted to a plug fitting screw 31b provided in the cylinder head 31.

COMPARATIVE EXAMPLE

A piston A of the structure as shown in FIG. 3, i.e., according to the third embodiment of the present invention, was produced by a procedure in which irregularities 22c were formed in the outer periphery 22b of the zirconia sintered body 22, the metal ring 23 made of SUS 304 was plated with nickel, they were then brazed with silver to produce an assembly, and the assembly was then cast molded with an aluminum alloy.

A piston B, a comparative example, was produced in the same manner as above except that the step of brazing the metal ring to the zirconia sintered body was omitted.

The pistons A and B were subjected to a durability test under conditions of 4,000 rpm $\times 4/4$. In the piston B, a clearance was formed between the zirconia sintered body and the aluminum alloy within 10 hours and the sintered body separated from the aluminum main body. On the other hand, in the piston A of the present invention, neither formation of a gap nor cracking was observed after 50 hours.

The present invention is not limited to the embodiments as shown in the drawings and is useful in application of a cylinder liner, a sub-combustion chamber, and a base, for example.

In the zirconia-metal composite body of the present invention, irregularities are formed in the surface of the zirconia ceramic part, coming into contact with the metallic part, and the zirconia ceramic and metallic parts are joined together by brazing through the irregularities. One of the advantages of the zirconia-metal composite body of the present invention is that the joint is very strong. Another advantage is that the ceramic part is prevented from cracking by the buffer action of the brazing material and thus a stabilized joining force can be maintained; that is, the zirconia-metal composite body of the present invention has excellent durability.

In the engine part of the zirconia sintered body and aluminum alloy composite body according to the third and fourth embodiments of the present invention, the heat resistant metal ring having a coefficient of thermal expansion intermediate between those of the zirconia sintered body and aluminum alloy composite body is placed therebetween, irregularities are formed in the outer periphery of the zirconia sintered body, and the zirconia sintered body and the heat resistant metal ring are joined together by brazing. One of the advantages of the present invention is that the joint is very strong. Another advantage is that the difference in coefficient of thermal expansion is minimized and the joining force among the zirconia, heat resistant metal ring, and aluminum alloy can be maintained at a high level; that is, the engine part has excellent durability. Still another advantage is that in joining the zirconia sintered body to the heat resistant metal ring, it is not necessary to provide a joining layer on the zirconia sintered body by techniques such as metallization treatment and glass coating followed by baking and thus a method of production of the engine part is simplified, leading to a reduction in product costs.

What is claimed is:

1. A ceramic and metal composite body comprising:

a ceramic member comprised of zirconia, said ceramic member including an outer peripheral surface having a plurality of indentations extensing within a portion of said outer peripheral surface;

a heat resistant metallic member contacting said outer peripheral surface of said ceramic member; and a brazing material formed in said identations to bond said metallic member to said ceramic member.

2. The ceramic and metal composite body as defined in claim 1, wherein said metallic member includes an electroplated metallic surface having a depth of at least about 10 microns, and wherein said brazing material bonds said electroplated metallic surface of said metallic member to said ceramic member.

3. The ceramic and metal composite body as defined in claim 2, wherein said electroplated metallic surface is selected from a group consisting of nickel and copper.

4. The ceramic and metal composite in claim 1, wherein said brazing material is selected from a group consisting of silver and copper.

5. The ceramic and metal composite in claim 1, wherein said pluralilty of indentations includes at least one groove.

6. The ceramic and metal composite in claim 1, wherein said plurality of indentations includes a knurled surface.

7. The ceramic and metal composite in claim 1, wherein said plurality of indentations includes a plurality of curved segments.

8. The ceramic and metal composite in claim 1, wherein said metallic member includes a substantially cylindrical projection and wherein said outer peripheral surface of said ceramic member is a substantially cylindrical bore, said outer peripheral surface having a diameter slightly larger than said metallic member allowing said projection to be positioned within said bore.

9. The ceramic and metal composite in claim 1, wherein said outer peripheral surface of said ceramic member is substantially cylindircal and wherein said metallic member includes a substantially cylindrical bore allowing said outer peripheral surface to be positioned within said bore.

10. A ceramic and metal composite body comprising:
a base member comprised of an aluminum alloy and having a substantially annular bore;

a heat resistant metallic ring positioned within said substantially annular bore and having an outer circumference and an inner circumference, said outer circumference contacting said substantially annular bore;

a ceramic member comprised of zirconia and including an outer peripheral surface having a plurality of grooves extending within a portion of said outer peripheral surface for engaging said inner circumference; and a brazing material formed on said ceramic member along said grooves to bond said electroplated metallic surface of said metallic ring to said ceramic member.

11. The ceramic and metal composite in claim 10, wherein said inner circumference includes an electroplated metallic surface.

12. The ceramic and metal composite in claim 10, wherein said metallic member is between about $10 \times 10^{-6}/°C.$ to about $24 \times 10^{-6}/°C.$ 13. The ceramic and metal composite in claim 10, wherein said brazing material is selected from a group consisting of silver and copper.

14. The ceramic and metal composite in claim 11, wherein said electroplated metallic surface is selected from a group consisting of nickel and copper.

* * * * *

UNITED STATES PATENT AND TRADEMARK OFFICE
CERTIFICATE OF CORRECTION

PATENT NO.   : 4,608,321
DATED        : August 26, 1986
INVENTOR(S)  : Yasushi Sato; Hiroshi Matsui It is certified that error appears in the above-identified patent and that said Letters Patent is hereby corrected as shown below:

Claim 1, line 4, "extensing" should be --extending--.

Claim 9, line 3, "cylindircal" should be --cylindrical--.

Signed and Sealed this

Twenty-seventh Day of January, 1987

Attest:

DONALD J. QUIGG

*Attesting Officer*     *Commissioner of Patents and Trademarks*